United States Patent [19]

Adler et al.

[11] Patent Number: 5,159,406
[45] Date of Patent: Oct. 27, 1992

[54] LIGHT-OPERATED ACCELEROMETER-TYPE TECHNIQUES

[75] Inventors: Robert Adler, Northfield, Ill.; L. Curtis Foster, Atherton, Calif.

[73] Assignee: Zenith Electronics Corporation, Glenview, Ill.

[21] Appl. No.: 399,730

[22] Filed: Sep. 28, 1964

[51] Int. Cl.⁵ .......................... G01B 9/02; G01N 9/24
[52] U.S. Cl. ...................................... 356/349; 73/601; 73/627; 356/28.5; 356/345; 359/285; 359/305; 359/333; 359/349; 372/13
[58] Field of Search ....................... 331/94.5; 250/199; 343/117.1, 7.3, 8; 88/14 PL, 10; 330/4.3; 356/5, 28.5, 345, 349; 372/13, 23, 28; 559/285, 305; 73/601, 627

[56] References Cited

U.S. PATENT DOCUMENTS

| | | | |
|---|---|---|---|
| 2,996,708 | 8/1961 | Tollefson | 343/8 |
| 3,174,044 | 3/1965 | Tien | 250/199 |
| 3,175,088 | 3/1965 | Herriott | 88/14 PL |
| 3,237,011 | 2/1966 | Sterzer | 331/94.5 X |
| 3,278,753 | 10/1966 | Pitts et al. | 331/94.5 X |
| 3,289,099 | 11/1966 | Masters | 331/94.5 |
| 3,293,438 | 12/1966 | Davis | 250/199 |
| 3,302,027 | 1/1967 | Fried et al. | 250/199 |

*Primary Examiner*—Stephen C. Boczinski
*Attorney, Agent, or Firm*—Hopgood, Calimafde, Kalil, Blaustein & Judlowe

[57] ABSTRACT

A laser based accelerometer system uses small motion induced shifts in frequency to measure the motion of an object without contact thereof. This technique is particularly useful for determining the vibratory and velocity characteristics of objects that are otherwise inaccessible for direct motion measurement by contact sensors.

14 Claims, 2 Drawing Sheets

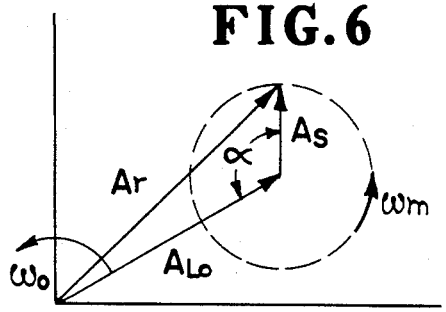
FIG. 6
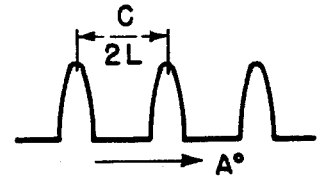
FIG. 8
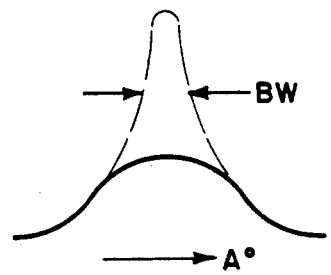
FIG. 9
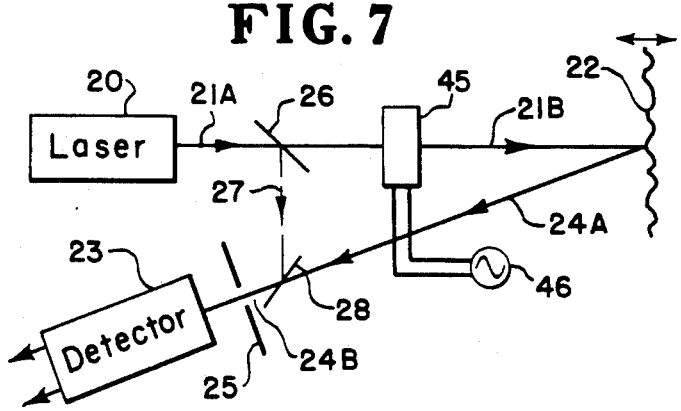
FIG. 7
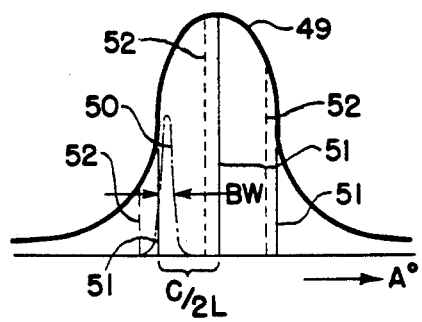
FIG. 10
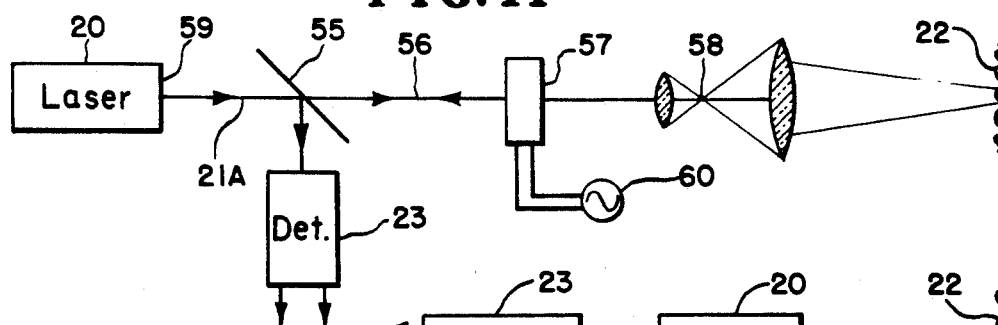
FIG. 11
FIG. 12
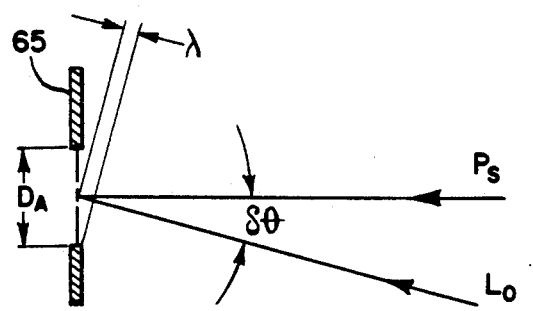
FIG. 13

LIGHT-OPERATED ACCELEROMETER-TYPE TECHNIQUES

The present invention pertains to Light-Operated Accelerometer-Type Techniques. More particularly, it relates to techniques utilizing light, such as that obtained from a laser, for determining information about remote elements Such information may pertain, for example, to the displacement, velocity, or acceleration of the element.

Known radar systems constitute means for determining information concerning the characteristics of motion of a remote object. Similarly, camera systems have been devised to determine other characteristics, such as variations in reflectivity across a target surface, in order to obtain an image of a remote object Arrangements also are known for determining the motion characteristic of a moving object through the use of light reflected from a mirror secured to the moving object With the development of the laser, various proposals have been advanced for the use of the coherent light produced by the laser in systems employing techniques somewhat analogous to previously developed radio-frequency radar techniques.

It is a general object of the present invention to provide a new and improved approach to the determination of information about an object, information generally of the same nature as that derived through the use of one or more of the aforementioned prior systems.

It is a more particular object of the present invention to provide a new and improved light-operated system capable of determining such object characteristics as presence, displacement, velocity and acceleration.

It is a further object of the present invention to provide a system of the aforementioned kind in which the desired information is obtained with improved signal-to-noise ratio, gain and selectivity.

Another object of the present invention is to achieve the foregoing information without the attachment of any parts, such as mirrors, sensors and the like, to the object being observed.

Still another object of the present invention is to provide an improved system of the foregoing character which is capable of being embodied in an apparatus characterized by significantly few system components and compactness and smallness of physical apparatus.

It is still another object of the present invention to provide a new and improved approach to the derivation of information concerning a remote object In accordance with one aspect of the present invention, the technique for determining the information comprises the development of coherent light. The light is directed onto a surface of an object. The surface is effective to return light having a parameter shifted by an amount representative of a characteristic of the surface. A portion of such light returned from the object is combined with another quantity of the developed light. A signal representative of the element characteristic is derived from the combination of the returned light portion and the other portion The derived signal may be utilized directly as a measure of one characteristic of the surface or may be processed to yield other information characteristic of the surface or of that which is happening to the surface.

Other objectives and features of the present invention will become apparent from the following description taken in conjunction with the accompanying drawings in the several figures of which like elements are identified by like numerals and in which:

FIGS. 2, 3, 4 and 6 are diagrams useful in connection with the description, in understanding the operational characteristics of the system depicted in FIG. 1;

FIG. 7 is a schematic diagram, partially in block diagram form of a modified form of the system depicted in FIG. 1;

FIGS. 8, 9, and 10 are diagrams of characteristics of laser apparatus embodied in the system of the invention;

FIG. 11 is a schematic diagram, partially in block diagram form, of another alternative embodiment of the inventive system;

FIG. 12 depicts in similar form still another embodiment of the present invention; and FIG. 13 is a diagram useful, in connection with the description, in understanding additional operational characteristics of the systems depicted in previous figures.

Figure 1:
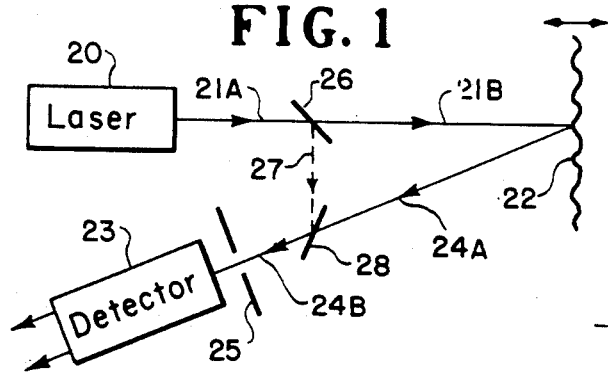
FIG. 1 is a schematic diagram, partially in block diagram form, of one embodiment of the present invention.

In the system of FIG. 1, a laser beam is projected from a laser 20 along a path 21A and a continuation thereof 21B to illuminate a spot on the surface 22 of an element or target capable of moving with a component of motion in a direction parallel with path 21B. Surface 22 is essentially a diffuse reflector which scatters the incident light generally throughout a hemisphere. Part of the scattered light is received by a detector 23 from along a path 24A and an extension thereof 24B. Preferably preceding detector 23 is an apertured plate 25 with the aperture size being selected to insure that all of the active received light is of the same phase and to avoid self-interference destructive of phase coherence. In this instance, laser 20 is of the continuous wave type, although it is contemplated alternatively to use a pulsed laser in order to obtain the advantage of higher peak energy.

The system presently under consideration is in one sense generally analogous to a continuous-wave Doppler radar useful for measuring the radial velocity of a moving target located at a distance from the transmitter. The part of the scattered light received at detector 23 has had its frequency shifted by the motion of the target. A number of different detection methods may be selectively utilized to extract the surface-motion information from the total received signal. In the system of FIG. 1, the arrangement is a simple one utilizing the principles of homodyne detection. To this end, the received signal is combined with a portion of the transmitted signal and the combination is then detected by conventional means.

More particularly, light following path 21A is intercepted by a partially-reflective mirror 26. A portion of the light along path 21A passes through mirror 26 and continues on path 21B without essential modification by the mirror. Another portion of the light in path 21A is reflected by mirror 26 along a path 27 where it is directed toward a partially-reflective mirror 28 disposed also across light path 24A. Mirror 28 passes at least a portion of the light in path 24A on along path 24B to detector 23 and at the same time reflects at least a portion of the light in path 27 so as also to travel along path 24B to detector 23. Adopting the conventional terminology of the radio art, the light received at detector 23 from path 24A may be thought of as the received signal while the light from path 27 is the local oscillator signal. Since the local oscillator signal has a frequency the same as that of the unmodulated or unshifted received signal, the detection operation is recognizable as being in accordance with the homodyne principle.

As will be discussed in more detail hereinafter, the output of the detector includes target-motion information and is processed in accordance with the specific kind of target information which is to be derived. For example, if the target is in uniform translational motion in the direction of the light beam 21B, the output of detector 23 operating as a photodetector is a sine wave whose frequency is determined by the relative velocity of the target. In another case, when the target is vibrating sinusoidally with a peak amplitude which is very small compared to the wavelength of the laser radiation, the detector output again is a sine wave whose frequency is equal to the frequency of vibration of surface 22 while the amplitude of the sine wave is a function of the peak displacement of the surface vibration.

In the case in which the target is vibrating sinusoidally with an amplitude many times the wavelength of the laser radiation, the homodyne detection process produces a complex spectral distribution of energy, characteristic of the spectrum of a wide-band phase-modulated wave. In this case, the required signal processing technique depends primarily on which parameters of surface motion are desired and is influenced also by the degree of accuracy or fidelity of determination. In general, however, the signal processing technique may be quite analogous to that of the detection of wide-band phase-modulated signals in the radio communications art. For example, a discriminator having sufficient definition at optical frequencies could be used directly in path 24A to extract the desired information; the illustrated homodyne arrangement is considerably more efficacious and is comparatively simple of practical formation. As will be discussed, however, additional refinement may be required to obtain a signal free of ambiguity in all cases.

As will become apparent, FIG. 1 not only depicts one useful embodiment of the invention but also serves to illustrate and exemplify the discussion of certain basic phenomena, an understanding of which leads to a fuller appreciation of the basic inventive concepts and of a number of ramifications stemming therefrom. However, before delving into some of these ramifications, it will be helpful to explore in more detail certain of the optical considerations arising in connection with the practice of the invention. For ease of understanding, it will be assumed, as is preferred, that all optical elements of the system, other than the target, are located within the near field of the beam from laser 20. The near field is that distance from the laser exit aperture beyond which light emerging from one side of the aperture interferes with light traveling parallel with the beam axis from the opposite side of the aperture. Assuming a circular aperture, the approximate near field limit r may be computed from the expression:

$$r \approx \frac{d^2}{\lambda} \quad (1)$$

where d is the diameter of the laser beam exit aperture and is the wavelength of the light.

Figure 2:
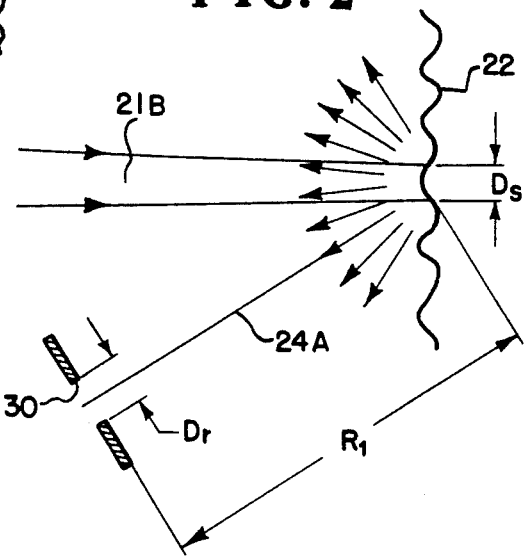

The system illustrated in FIG. 1 is fully workable when surface 22 is specular, provided it is correctly oriented. However, significantly increased utility results from use of the system when surface 22 is diffuse. FIG. 2 depicts the light along path 21B illuminating diffuse surface 22 over a spot having a diameter $D_s$. Surface 22 scatters the impinging light throughout a hemisphere as indicated by the array of similar arrows in FIG. 2. The return light to be detected follows path 24A and constitutes but a part of the scattered light. Of necessity to any system, the light passes through some means defining a receiving aperture 30 having a diameter Dr. For an input power $P_o$ in the beam arriving along path 21B and assuming no absorption losses and 100% reflectivity, the received power $P_r$ in the beam passing through aperture 30 along path 24A is determinable in accordance with the relationship:

$$P_r = \frac{KP_oD_r^2}{8R_1^2} \quad (2)$$

where $R_1$ is the distance from surface 22 to aperture 30 and K is a constant according to Lambert's Law as modified by the surface texture and having a maximum value of two when the light returns along the path of the incident light and normal to the surface.

Figure 3:
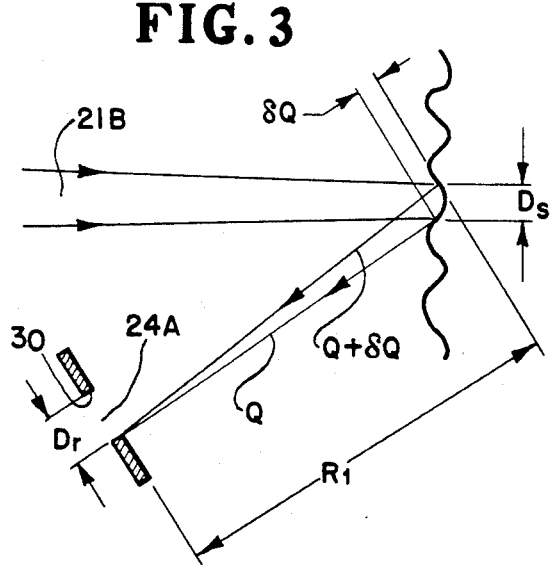

Another consideration in connection with the optical system is analogous to the maintenance of operation in the near field range as discussed above. The distance $R_1$ should be such that there is less than one light wavelength difference between the two return paths individually from opposite sides of the spot or surface 22 to one side of aperture 30. With reference to FIG. 3, one such path length is of a distance Q while the other has a length Q+$\delta$Q; phase coherence of the light will be maintained so long as $\delta$Q is less than $\lambda$ where $\lambda$ is the wavelength of the light. This represents a condition in which the receiving aperture 30 is limited to the first zone of the diffraction pattern of the light from surface 22. A more direct expression for the desired parameters is given by the relationship:

$$D_r \leq \frac{G\lambda R_1}{D_s} \quad (3)$$

where G is a constant which is a function of the intensity distribution across the beam and has a value of 2.44 for a uniform distribution.

Somewhat similarly, the transmitted beam along path 21B traverses an aperture $D_t$, assuming that the beam completely fills that aperture. To achieve a desired spot diameter $D_s$ which is the same as that of the central fringe of the diffraction pattern at surface 22, the relationship for the parameters is expressed by:

$$D_t = \frac{G\lambda R_2}{D_s} \quad (4)$$

where $R_2$ is the distance from the transmitting aperture to the spot of illumination on surface 22. A comparison of equations (3) and (4) reveals an optimum choice for the receiving and transmitting apertures where the diameters of the two are equal as are the distances of the apertures from surface 22. This optimum condition is then one in which the transmitting and receiving apertures are both optimumly related to the spot size on surface 22. For a given spot size, the maximum range to surface 2 is limited only by the selected size of the apertures. Since the optics involved have dimensions many times larger than the light wavelengths involved, it is possible to concentrate all of the laser beam power into a small spot through the use of a suitable system. This unique condition also enables the optical system to be simplified by making the transmission and reception paths coincide. An embodiment taking advantage of this coincidence of the two paths will be discussed in more detail below. Of course, such coincidence removes any necessity to account for refractive displacement of the beam paths, as in traversing mirrors 26 and 28 for example, since such displacement in one direction is effectively cancelled when the light travels in the return direction.

Figure 4:
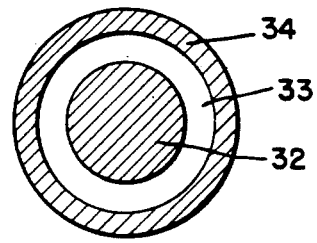

In connection with the diffraction pattern of the laser beam spot upon surface 22, an apparent critical size of transmitting aperture $D_t$ is that in which the spot on surface 22, as viewed with a wide aperture from a distance equal to that from laser 20 to the surface, is essentially one solid field of illumination as depicted by area 32 in FIG. 4. This contrasts with the spot as so viewed when the transmitted beam passes through a large aperture in which case it appears as being composed of a plurality of randomly distributed dots of light. Such phenomena can be seen with the human eye which normally has a comparatively wide aperture. On the other hand, when the size of the transmitting aperture is smaller then the so-called critical size, the pattern appearing on surface 22 as so viewed is that of a fully illuminated core 32 surrounded by one or more annuli 33 and 34 alternately dark and fully illuminated. The light from the first surrounding illuminated annulus 34 is out of phase with the light received from the illuminated core, while the light from the next illuminated ring is in phase with that from the core. Consequently, phase coherency of the light in the returning beam is exploitable through the us of what may be termed zone plates or a mask to select only the alternate regions of same-phase light from the diffraction pattern on surface 22; FIG. 4 may also be deemed to depict such a mask with area 32 being transmissive and area 34 being opaque. However, for simplicity and ease of understanding hereinafter, it will be assumed that the receiving and transmitting apertures are determined in accordance with equations (3) and (4).

Figure 5:
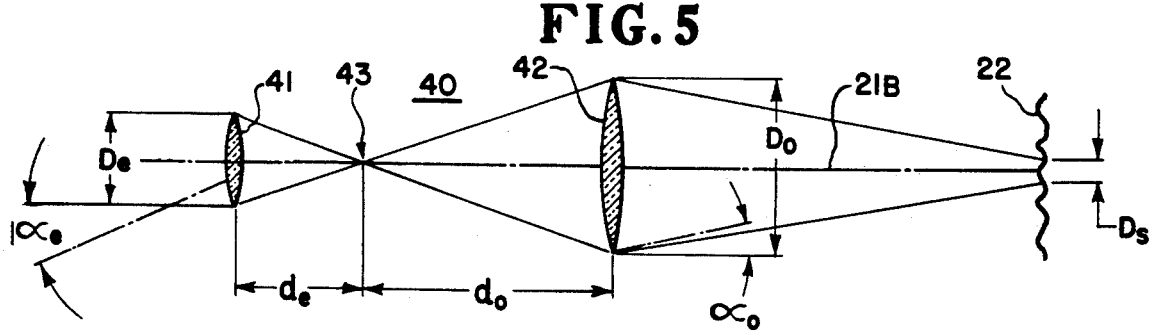
FIG. 5 is a diagrammatic representation of a portion of an optical system preferably utilized in the system illustrated in FIG. 1.

For discrimination in terms of selectivity of target information, that is, in order to localize the portion of surface 22 to be examined, it is desirable that spot diameter $D_s$ be minimized. This objective is also of similar import in that it enables the size of the transmitting and, more importantly, the receiving apertures to be increased while maintaining phase coherency, enabling the translation of maximum power, other parameters being equal. As will be shown, an increase in the size of the receiving aperture in the beam path is particularly important to the signal-to-noise ratio of the system. To the foregoing ends, it is contemplated to utilize a telescope or telescopes for both the sending and receiving beams. A typical embodiment may be considered for purposes of explanation as being disposed in beam path 21B, in which case the conventional telescope is positioned as it would normally be to observe surface 22 from the position of laser 20. Telescope 40 of FIG. 5 is composed of an eye-piece 41 and an object lens 42. The utilized portion of eye-piece 41 may be considered as defining an aperture of diameter $D_e$ and the utilized portion of 20 object lens 42 as defining an aperture having a diameter $D_o$; as a practical matter, eye-piece 41 preferably is larger than otherwise required in order to reduce criticality of alignment. In general, the light beam approaching eye-piece 41, from the left in FIG. 5, is focused beyond the eye-piece at point 43 from whence the light diverges to object lens 42. The latter in turn focuses the light to a point approximately at surface 22. For a given total magnification factor of the telescope, the size of the spot on surface 22 is reduced by that same factor below that which would be its size without telescope 40 if a simple projection lens of aperture $D_e$ were substituted.

In telescope 40, the distance from eye-piece 41 to its focal point 43 is denoted $d_e$ and the distance from the focal point to object lens 42 is denoted $d_o$. The magnification M is equal to $d_o/d_e$. With respect to the amount of light translated by the telescope, the F number of each lens in the system is equal to its focal length divided by its useful aperture diameter. When the optical system must be designed to utilize minimum-sized optical components for the necessary apertures, it is desirable for transmission efficiency that the F numbers of the two lens elements be the same. Since $D_o/D_e$ were defined as the utilized lens portion, $D_o/D_e$ also is equal to the magnification M. At the same time, the ratio $a_e/a_o$ is likewise equal to M where $a_e$ defines the angle between a given ray of light and the normal to the eye-piece and $a_o$ defines the corresponding angle of that light at the object lens.

In designing telescope 40, attention is also given to whatever depth of focus is desired at surface 22; the depth of focus varies as $M^2$. When used in the return signal path, telescope 40 operates in its forward or magnifying direction.

Returning to a consideration of FIG. 1, detector 23 may include any kind of photo-sensitive element responsive at least to the frequency component within the returned light beam representative of motion of surface 22. While a conventional photo-multiplier has been employed, a solid-state silicon photodetector cell has been more advantageously utilized in one operating system embodying the invention. As seen by detector 23, the received signals may be represented by the phasors depicted in FIG. 6. The local oscillator signal phasor is of an amplitude $A_{Lo}$; as is conventional, the entire diagram of FIG. 6 represents a system rotating at the local oscillator radian frequency $\omega_o$ and with reference to that variable FIG. 6 is stationary. Added to phasor $A_{Lo}$ is a phasor $A_s$ having an amplitude $A_s$ representative of the received signal amplitude and which rotates about its origin at the signal radian frequency $\omega_m$, this being the signal which is a function of the motion of surface 22.

In this system, $A_s$ is much smaller in amplitude than $A_{Lo}$. The photo-cell in detector 23 in effect measures the square of the resultant phasor $A_r$. As will be observed from FIG. 6, the amplitude of resultant phasor $A_r$ varies between a value of $A_{Lo}-A_s$ and $A_{Lo}+A_s$ with the average detected current corresponding in magnitude to the square of $A_{Lo}$. The relationship between the phasors in FIG. 6 is as follows:

$$A_r^2 = A_{Lo}^2 + A_s^2 - 2A_s A_{Lo} \cos\alpha \qquad (5)$$

where $\alpha$ is the angle between phasors $A_{Lo}$ and $A_s$. The photo-cell detector responds to the quantities $A_{Lo}^2$ and $A_s^2$ by generating corresponding average current. The detector also responds as a demodulator to the cross-product term in equation (5); operating in accordance with its square-law characteristic, detector 23 directly provides an output current which is a function of the quantity $2A_sA_{Lo} \cos\alpha$.

Following the discussion by B. H. Oliver at pages 1960 H 61 of the December 1961 issue of the "Proceedings of the I.R.E. Vol. 49, No. 12, the signal-to-noise ratio of the receiving process may be analyzed in connection with the expression:

$$S/N = \eta \left[ \frac{P_s P_{Lo}}{h\gamma B(P_{Lo} + P_s)} \right] \quad (6)$$

where $\eta$ is the quantum efficiency of the detecting element, $P_s$ is the power of the received signal, $P_{Lo}$ is the power of the local oscillator signal, h is Planck's constant, $\gamma = \omega_o/2\pi$ and is the frequency of the light, and B is the post detection bandwidth of interest. The term $P_s P_{Lo}$ in the numerator corresponds to the detector current $A_s A_{Lo} \cos \alpha$, while the denominator in equation (6) is representative of the shot noise. The denominator term $\eta\gamma$ is the quantum noise.

In a practical system, the power $P_{Lo}$ in the local oscillator signal is many times that of the power $P_s$ of the received signal. Consequently, the analysis of signal-to-noise ratio is simplified by reducing equation (6) to the following form:

$$S/N = \frac{\eta P_s}{h\gamma B} \quad (7)$$

Substituting in equation (7) the value of $P_s$ as determined from equation (2) in consideration of the scattering by surface 22, and at the same time accounting for system parameters, the relationship becomes:

$$S/N = \frac{\eta P_o D^2 S(\phi) L}{h\gamma B 8 R^2} \quad (8)$$

where $P_o$ is the power in the light beam impinging upon surface 22. D in the system of FIG. 1 is the aperture diameter $D_r$ explained in connection with FIG. 2 and also the object lens diameter explained in connection with FIG. 5 when telescope 40 is utilized as described. R similarly is the distance to aperture 30 in FIG. 2 and the corresponding distance from surface 22 to object lens 42 as explained in connection with FIG. 5. $S(\phi)$ represents additional scattering throughout the system and accounts for any angular non-uniformity of scattering by surface 22. L (always $\leq 1$) represents the power loss in the system; this loss includes undesirable surface reflections from optical components, transmission absorption and scattering, and power transmission through the target (a function of the reflectivity of surface 22).

To gain a practical grasp of the relationship expressed by equation (8), it is illustrative to consider typical values as applied to a representative system. In such a system, a helium-neon laser with a cavity approximately one-foot in length is utilized to develop a light beam having a wavelength of 6328° Å. Of course, $\gamma = C/\lambda$, where C Is the velocity of light. Silicon solar cells of the kind mentioned previously have exhibited efficiencies, in the frequency range in question, of about 50%. However, to provide a conservative estimate of the quantitative results, assume $\eta$ to have a value of 0.2. Also being very conservative, assume the quantity $S(\phi)$ L to be equal to 0.1; for example, the high local oscillator power available enables a power loss from the signal beam of only 4% in each of mirrors 26, 28, or a total of 8%. Utilizing a 6-inch reverse telescope to establish an aperture diameter D of 0.5 feet, a laser beam having a power of one milliwatt, assigning a post detection bandwidth of 10 kilocycles, and operating with a range R of 1 mile, equation (8) indicates a signal-to-noise ratio of about 10. Viewed another way, for a system exhibiting a signal-to-noise ratio of 10, the effective range is approximately one mile.

Other things being equal, the range may be increased by increasing the laser beam power or the aperture diameter; as noted heretofore, the optics permits concentrating the beam power into a small spot and the range is essentially limited only by the size of receiving aperture available. The range may also be increased when the character of the motion being observed requires less bandwidth. The post detection bandwidth may be narrowed, for example, by tuning the photo-sensitive element so that it exhibits a sharp resonance; in any case, the post detection bandwidth is of at least the width necessary to convey the desired information. Additionally, refinement of the electronic circuitry associated with detector 23 to permit the readability of signals approximating the noise level enables proportionately greater range. It is also noteworthy that in a system having the values illustrated above, for a useful range of about 500 feet the diameter $D_s$ of the spot at surface 22 is approximately one-millimeter. This also is approximately the diameter of the beam as it exits from the laser in the representative system.

Turning now to a consideration of the information available from the output of the photo-sensitive cell in detector 23 and of the manner in which correlated information may be derived therefrom, it is instructive to observe the radian frequencies of the light in the different paths denoted in FIG. 1. Letting the light radian frequency in path 21A be represented by $\omega_o$, the local oscillator light in path 27 and the continuing light portion in path 21B will also have a frequency $\omega_o$. Due to motion of surface 22 at a velocity $v_t$, the frequency of the light in path 24A is shifted to a value $\omega_o + \omega_m$. Consequently, the portion of the signal in path 24A which continues along path 24B also has a frequency $\omega_o + \omega_m$. When all elements of the system including target surface 22 are fixed in space, the signal received at detector 23 will have the same frequency as that in the beam impinging upon surface 22. However, when surface 22 moves (has a component of motion in a direction parallel to beam path 21B), there is one cycle of shift in frequency of the light directed along path 24A for each half-wavelength ($\lambda t/2$) of motion of surface 22 in a direction along path 21B. This relationship may be expressed as follows:

$$\omega_m = 4\pi V_t/\lambda \quad (9)$$

When surface 22 is in vibratory motion and the homodyne detection process of FIG. 1 is used, in which the local oscillator frequency is the same as that of the beam representing the signal carrier, the carrier frequency difference $\omega_m$ is a signal varying about a zero (or constant) value. It is not possible with this information alone to determine in which direction the signal changes relative to the zero condition. That is, there is an ambiguity. With reference to FIG. 6, it will be seen that ambiguity arises because the resultant phasor $A_r$ detected by detector 23 varies in amplitude symmetrically above and below the amplitude level of the local oscillator vector $A_{Lo}$. With one cycle of light frequency shift for each half-wavelength of target motion, the detector may sense a plurality of signal cycles when only one increment of target motion occurs.

To resolve the foregoing ambiguity, the light in either one of the sending and receiving paths may be purposely shifted in frequency by a controllably fixed amount, enabling utilization of a signal derivation process which is free of any ambiguity and which is simple in practice. An embodiment of the present invention including this feature is shown in FIG. 7. The apparatus in FIG. 7 is identical to that described above with respect to FIG. 1 except for the inclusion in path 21B of a Doppler cell 45 energized from a signal source 46.

While in principle, cell 45 may take the form of any electro-responsive device capable of responding to a low frequency signal and shifting the frequency of the laser light by a frequency increment corresponding to the low frequency signal, a very simple and practical device of this nature is a cell of the kind disclosed by P. Debye and F. W. Sears, in an article entitled "On the Scattering of Light by Supersonic Waves" which appeared in "Proceedings of the National Academy of Sciences", Vol. 18, pp. 409-414 (1932). Such a cell is composed of a container disposed in the light path and through which the light passes. The container is filled with a material which in the illustrated embodiment is water. In one end of the container, to one side of path 21B, is a transducer having a vibrating surface lying in a plane which in the present environment preferably is tilted with respect to the light path through the cell.

In response to the signals from source 46, the transducer generates compressional waves in the water. The transducer, and for practical convenience the entire cell, is tilted so that these waves lie in planes preferably forming a Bragg angle to the path of the light beam. Such Bragg angle orientation is analyzed more fully in the copending application of Robert Adler, Ser. No. 388,589, filed Aug. 10, 1964 and assigned to the same assignee as in this application. In passing through cell 45, the light is shifted in frequency by an amount corresponding to the frequency of the signal from source 46. The light also is refracted at the Bragg angle so that path 21B in practice is tilted at an angle to path 21A. For simplicity of illustration, such tilt has not been shown in the drawings.

In operation, light from laser 20 following path 21A and approaching Doppler cell 45 has a frequency, as before, of $\omega_o$. By virtue of the action of cell 45, the light in path 21B leaving the cell has a frequency $\omega_o + \omega_\delta$; this is the light from which the spot is formed on surface 22. The vibration or movement of surface 22 shifts the frequency of the light returning along path 24A so that it may be represented by the expression $\omega_o + \omega_\delta + \omega_m$. The value of intentional Doppler shift $\omega_\delta$ is greater than the motion-representative frequency $\omega_m$ in order that the aforementioned ambiguity is eliminated. As before, a local oscillator signal of radian frequency $\omega_o$ is derived from the laser radiation by means of mirror 26 and traverses paths 27 and 24B so as also to be received by the photo-sensitive element in detector 23.

Also the same as in the case of the embodiment of FIG. 1 the photocell in detector 23 detects the combination of return beam and local oscillator beam signals. The photo-sensitive element develops an output current representative of the term $\omega_{67} + \omega_m$. As before, the quantity $\omega_m$ is representative of the velocity of surface 22 and the overall function of detector 23, therefore, is to derive that particular term.

For the purpose of deriving the desired information, detector 23 includes a frequency-modulation discriminator to which the electrical signal developed by the photo-sensitive cell is fed. There is nothing critical, as such, about the particular type of discriminator employed; it may be any of the well-known types, such as the Foster-Seeley, ratio detector or the gated-beam tube quadrature detector explained, for example, in U.S. Pat. No. 2,568,137 issued in the name of Robert Adler. The general expression for the discriminator output potential is as follows:

$$V_o = k (\omega_c - \omega_s), \qquad (10)$$

where $\omega_c$ is the center frequency of the discriminator, $\omega_s$ is the signal received by the discriminator and k is a constant. Unless particularly noted hereinafter, the symbol k in any given equation includes all constants and is not of the essence to the operation of the system. With reference to a conventional discriminator characteristic, $\omega_c$ represents the frequency about which the two inversely-related peaks of output response are symmetrical with respect to frequency.

Substitution in equation (10) of the signal detected by the photocell in detector 23, the term $\omega_\delta + \omega_m$, yields the relationship:

$$V_0 = \frac{k}{2\pi} [\omega_c - (\omega_\delta + \omega_m)] \qquad (11)$$

A signal directly representative of target motion is obtained simply by choosing $\omega_c$ of the discriminator to be equal to , since the latter in a given application may also be fixed. Consequently, equation (11) reduces to:

$$V_0 = \frac{-k}{2\pi} \omega_m \qquad (12)$$

It will be recalled that the motion-representative frequency $\omega_m$ is given by the expression:

$$\omega_m = 4\pi V_t/\lambda \qquad (13)$$

or:

$$V_0 = 2k V_t/\lambda \qquad (14)$$

Since the quantity $2k/\lambda$ is a constant, it is seen that the discriminator output signal $V_o$ is directly a function of the surface motion velocity $V_t$. Consequently, the surface velocity may be read directly by feeding the discriminator output to a voltmeter, oscilloscope or other read-out device which may be calibrated directly in terms of feet per second or other convenient system of units.

To understand the manner of derivation of other information concerning the motion of surface 22, it will be helpful to consider the case in which surface 22 is part of a mechanical system in which the surface is being intentionally moved, for example shaken, by applied mechanical forces with the system operating below the resonant frequency of either the element-bearing surface 22 or of the apparatus applying the forces. Consequently, the displacement x of surface 22 at a time t is in accordance with a relationship such as:

$$x = X_o \sin\omega t,$$

where $x_o$ is the peak displacement and $\omega$ is the frequency of motion of surface 22. Accordingly, the velocity of motion of surface 22 is the first derivative of displacement in terms of time, or:

$$v_t = X_o \omega \cos\omega t \qquad (16)$$

Similarly, the acceleration of the surface is the second derivative with respect to time, or:

$$a_t = -X_o \omega^2 \sin\omega t \qquad (17)$$

As pointed out in connection with equation (14), detector 23, including its photo-sensitive element and discriminator, yields an output voltage $V_o$ which is proportional to the surface velocity $v_t$. Substituting equation (16) in equation (14) and lumping the constants.

$$V_o = -k\omega\cos\omega t \qquad (18)$$

The displacement of surface 22 is obtained by integrating the discriminator output potential $V_o$, yielding a signal of the form:

$$x_t = k \sin \omega t + k \qquad (19)$$

Thus, displacement information is obtained when the signal from the discriminator in detector 23 is fed to a conventional integration network having a fixed translation constant corresponding in value to the fixed values of k in equation (19); its output potential represents the displacement of surface 22.

Similarly, the acceleration of surface 22 is derived directly by differentiating the output potential $V_o$ obtained from the discriminator in detector 23. That is, differentiating equation (18) with respect to time yields a relationship of the form:

$$a_t = -\omega^2 \sin \omega t \qquad (20)$$

Again, the differentiating network is conventional; its output potential is representative of the acceleration of surface 22.

The invention finds direct utility in the field of non-destructive testing. The displacement, velocity or acceleration of a moving element is directly measurable without the need for connecting wires or mechanical coupling to the element under study. Consequently, it is only necessary that the radiation be directed to form the spot anywhere upon a surface the movement of which is to be analyzed.

Turning now to a consideration of other ramifications of the measurements systems in question, a typical helium-neon laser takes the form of a Fabry-Perot cavity within which the gas is caused to produce coherent light. As is known, such a laser yields an output characterized by the existence of several so-called longitudinal modes. These modes may be represented as amplitudes in terms of frequency as depicted in FIG. 8. Each mode is separated from the next by a frequency ($\omega/2\pi$) value of C/2L, where L is the cavity length (the distance between the mirrors at opposite ends of the laser) and C is the velocity of light. In the typical HeNe laser discussed, having a cavity of about 1-foot in length, C/2L is approximately equal to 500 mc.

The response curve of each mode in the Fabry-Perot laser resonator is generally of the form shown in FIG. 9 in terms of change of relative amplitude as a function of frequency. The response represented by the solid curve is a function of the cavity alone and is in the form of a conventional resonance curve having a half-power bandwidth determined by the mirror spacing and reflectivity. However, the overall active response curve of each mode depicted in FIG. 8 includes the contribution of the active gas; the active gas sharpens the resonance as illustrated in FIG. 9 by the dashed curve which extends upwardly centered about the spectral line of gas activation. The resulting passband, indicated by the symbol BW in FIG. 9, is but a fraction of the center frequency of the curve.

For the exemplary HeNe laser operating at a spectral line of 6328°Å, the gaseous Doppler line width typically is of the order 1400 mc and is indicated by curve 49 in FIG. 10. Laser action will occur for any spacing between the mirrors corresponding to a value of $N\lambda/2$ where $\lambda$ is the wavelength of the radiation and N is an integer, or for any spacing equal to $(N\pm m)\lambda/2$ where m can be any integer as long as this quantity is within the gaseous Doppler line width. In terms of the overall response of the laser, as depicted in FIG. 10, the actual frequency of stimulation may be anywhere under curve 49; laser action occurs when the gas is activated anywhere within the overall bandwidth of the laser and, for the example given, this essentially means within about ±700 mc of the center frequency of 6328° Å. Further, the laser oscillation will be perturbed by stimulation within the active bandpass indicated by curve 50 which corresponds to the dashed curve of FIG. 9.

In actual operation, spike 50 (which may be in the order of 140 kc wide) not only is extremely narrow compared to the total overall response but also is constantly and randomly wandering within the gaseous Doppler line width. This feature of the operation of the laser renders the overall system of the invention well protected against background light and also against being rendered inoperative or jammed by interfering light; ordinary background "white" light has insufficient intensity at any specific frequency of possible activation of the laser to be of any significance. Any such interfering light would not only have to be focused in line with the optical system involved and be produced by operation in the vicinity of the same spectral line of lasing, but also would have to be within the active passband represented by curve 50 and follow its random displacement in terms of frequency.

It has been noted that the frequencies corresponding to each of the longitudinal-mode responses as illustrated in FIG. 8 may vary in relation to overall response curve 49. For example, longitudinal mode activity in the illustrative laser may occur at points in terms of frequency as indicated by solid lines 51. On the other hand, the same laser may be operating with the points of longitudinal mode activity occurring as indicated by dashed lines 52 which are unsymmetrically placed with respect to the overall response curve 49.

Laser 20 is capable of operating in either a passive or active condition with respect to its own light returned in a manner so as to follow a path coincident with the beam exiting from its cavity or otherwise so as to reenter the cavity. In essence, the laser accepts only its own returning light or light of instantaneous frequency within its active passband (curve 50). This is the property which makes it difficult to render it inoperative through means of light, for example, from another laser. Security in this form of built-in agility results from the narrow bandwidth and because the operating line wanders, as discussed above. When light returned to the laser cavity is of the same frequency as the exiting light or has been shifted in frequency by an amount sufficiently small so as still to fall within the narrow bandpass indicated by curve 50 in FIG. 10, the effect of the returning light is intensified by regeneration within the laser. However, when the return radiation has been shifted in frequency so that it falls outside the active response indicated by curve 50 in FIG. 10, substantially all of the returned beam is reflected by the cavity mirror directly back along the path from which it came. For example, when the returned light falls midway between the mode responses depicted in FIG. 9, more than 98% of the light is reflected by the mirror. Advantage is taken of this latter phenomenon in the embodiment illustrated in FIG. 11 in order to simplify considerably the physical apparatus as compared to that in the embodiments in FIGS. 1 and 7.

In the embodiment of FIG. 11, laser 20 directs its radiation along path 21A through a partially reflective mirror 55. The radiation continues along a path 56 through a Doppler cell 57. After passing through cell 57, the beam traverses a reverse telescope 58 operating like telescope 40 of FIG. 5 so as to be focused into a spot upon surface 22. The return portion of the light scattered from surface 22 follows the same path through telescope 58 and Doppler cell 57, through partial mirror 55, and back to the exit mirror 59 in laser 20. Substantially all of the returned beam is reflected from exit mirror 59 along path 21A, since in this instance the frequency shift of the returned beam is large compared to the active bandwidth of the laser so as to fall outside curve 50 of FIG. 10. A portion of this returned light reflected from mirror 59 is reflected by partial mirror 55 onto the photo-sensitive element in detector 23. At the same time, a portion of the original radiation traversing path 21A is reflected by mirror 55 onto detector 23 to serve as a local oscillator signal.

The operation of the embodiment of FIG. 11 is essentially the same in terms of signal processing as that discussed with respect to the embodiment of FIG. 7. The major advantage of the FIG. 11 embodiment is the simplicity of apparatus and the resulting ease of optical alignment. The original light of frequency $\omega_o$ is shifted in frequency by Doppler cell 57 by an amount $\omega_\delta/2$ corresponding to the frequency of the signal from source 60 feeding cell 57. Consequently, the spot formed on surface 22 has a frequency $\omega_o+\omega_\delta/2$. The returned beam, shifted by $\omega_m$ because of the motion of surface 22, again traverses cell 57 and has its light further shifted in frequency, so that the light reflected off the outside surface of mirror 59 and then directed by way of mirror 55 to detector 23 has a final frequency represented by the quantity $\omega_o+\omega_m$. The heterodyne detection process in detector 23 is the same as that discussed above with regard to FIG. 7. It is thus feasible to process selectively the return light and the output signal from detector 2 in the same way to yield the same desired target information as in the previously discussed embodiment.

It will be noted that in the case of FIG. 11, the use of Doppler cell 57 accomplishes two desired functions. As discussed in connection with cell 45 in FIG. 7, the cell functions to remove ambiguity from the returning information. At the same time, cell 57 serves to shift the frequency of the returned beam to a value falling outside the bandpass established by the gas response indicated by curve 80 in FIG. 10. As a practical example utilizing the HeNe laser discussed above, merely shifting the frequency about 10 mc is sufficient to insure reflectivity from mirror 59 of more than 98%. Utilizing a signal $\omega_\delta/2$ of 42.5 mc from source 60, the total shift due to the cell is 85 mc. A delineating aperture preceding detector 23, as in FIGS. 1 and 7, is not shown in FIGS. 11 since lens system 58 designed in accordance with equation (3) does not return any self-interfering light along path 21A.

The basic nature of the system is further revealed in the embodiment shown in FIG. 12. For simplicity, the beam from laser 20 is merely caused to fall directly upon surface 22 and the light returning from surface 22 reenters laser 20. In this instance, detector 23 is placed in the path of the so-called back-beam of laser 20. In a laser of the exemplary kind utilizing a Fabry-Perot cavity, radiation may exit through both mirrors. Of course, the reverse telescope of FIG. 5 may advantageously be employed in the system of FIG. 12 in order to increase the range. A Doppler cell 57a having a source 60a like cell 57 in FIG. 11, may also be employed in the path between laser 20 and surface 22 in order to shift the frequency by an amount necessary to remove any ambiguity as discussed above, but subject to the following comments.

When the frequency of the signal energizing any Doppler cell or other means of shifting the return-beam frequency is sufficiently low that the frequency of the returned beam is within the resonant bandpass of the laser, so as to fall within the active bandwidth represented by curve 50 in FIG. 10, the resonant oscillation of the laser itself is perturbed by the returning signal and regeneration occurs. In effect, the returning radiation in the FIG. 12 system beats directly within the laser with the laser radiation itself so that homodyning takes place in the cavity. In this situation, the only essential function of detector 23 is that it derives the beat frequency component from the radiation emerging from the laser, which in this case not only serves as a local oscillator but also as an amplifier for the slightly frequency-shifted signal. In this mode of operation, detector 23 simply monitors the oscillation amplitude in the laser. As a further variation of the system merely metering the pump energy supplied laser 20 affords an indication of the presence of surface 22 or of a change from a static condition of surface 22. When the surface first appears in the beam path or when it first starts to move, the laser oscillation amplitude increases with a resulting increase in the pump power demanded by the laser.

In embodying the operative principle just discussed, of amplifying the return signal within the laser, it is not necessary to monitor the laser back beam as depicted for illustration in FIG. 12. For example, the apparatus of FIG. 11 may be used in the same manner provided that the total frequency shift of the return beam is within the resonant bandpass depicted by curve 50 in FIG. 10. Processing of the output signal from the photo-sensitive element in detector 23 is the same as discussed for the earlier embodiments, the element responding to a beat frequency of a value within the curve 50 passband of the typical laser.

Practical forms of Doppler cells 57 and 57A typically exhibit frequency shift of the traversing light greatly in excess of the resonant bandpass of laser 20. To enable regenerative or active laser response as in the system of FIG. 12 while yet incorporating the technique of imparting a fixed frequency shift to the beam cell 57 as used in either FIG. 11 or FIG. 12 may be composed of two cells in series in the beam path. One of the cells up converts the light frequency and the other down-converts it, with the two cells causing a difference in frequency shift by a small amount so that the returned light has a frequency shift by a small amount so that the returned light has a frequency falling within curve 50 of FIG. 10. Alternatively, active or regenerative response of laser 20 to the returned beam may be achieved by assigning a total frequency-shift value to cell 57 (both traverses) so that the returned light has a frequency falling within the resonant bandpass associated with one of the other longitudinal modes lying under curve 49 in FIG. 10; that is, the total shift approximates the value C/2L discussed above. When this alternative is chosen, it is advantageous to phase-lock the longitudinal modes to each other in order to avoid the addition of a randomly varying component arising from the imperfect stability of the frequency differences between un-locked modes.

Further to an understanding of the optical principles involved, FIG. 13 is illustrative of a consideration which should be taken into account in any of the systems such as those of FIGS. 1 and 7 in which it is intended that there be coincidence between two different beams of radiation as along path 24B. This criticality illustrates the advantages of the coincident systems of FIGS. 11 and 12. $D_A$ is the diameter of an aperture 65 through which it is intended, for example, to pass both a signal beam and a local oscillator beam indicated respectively by the symbols $P_s$ and $L_o$. The problem is analogous to the discussion above with regard to the near field of the laser and in connection with FIG. 3 relative to the receiving aperture 30. That is, the angle $\delta\theta$ must be no greater than that value which permits the difference in path lengths to cause destructive interference. The limit of is $\delta\theta$ is $\lambda/D$.

There have been discussed several different embodiments which take the general form of measurements systems. In use as an accelerometer, the characteristics of a typical laser as discussed are such that the system bandwidths readily obtainable will accommodate measurements with respect to surfaces having velocities of the order of 100 inches per second in either direction. Such a velocity corresponds to a total bandwidth of the order of 20 mc, for example.

Variations in the locations of the various essential components are contemplated. The local oscillator beam of FIGS. 1 and 7 may be derived instead from the back beam. The return beam in FIGS. 11 or 12 may be reflected so as to enter the laser cavity through its rear mirror. In any such case, however, the function of detector 23 is to deliver a signal which is a function or is characteristic of motion of surface 22.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. Apparatus, comprising:

means for developing coherent light;

means for directing said light onto a surface of an element and effective to return a portion of said light having a parameter shifted by an amount representative of a characteristic attendant to said surface;

a pair of frequency shifting means, one of which shifts the frequency of light higher and the other of which shifts the frequency of light lower with the amounts of said two shifts being unequal, for shifting the frequency of light a predetermined amount;

means of combining light, which has been shifted in frequency by said shifting means and which also has experienced a shift in said parameter at said surface, with another quantity of light from said developing means; and means for developing from the combination of said returned light and said other quantity a signal representative of the product of said portion and said quantity and for processing said signal to yield another signal representative of said characteristic; in which said developing means is a laser having a resonant passband, in which said predetermined amount is of a value causing the returning light to have a frequency within said resonant passband to excite the laser into regeneration, and in which said combining means directs the returning light into said laser.

2. Apparatus, comprising:

means for developing coherent light;

means for directing said light onto a surface of an element and effective to return light having a parameter shifted by an amount representative of a characteristic attendant to said surface;

means for combining light, which has experienced a shift in said parameter at said surface, with another quantity of light from said developing means;

means disposed in the light path between said developing means and said surface and also disposed in the light path between said surface and said combining means for shifting the frequency of the light a predetermined amount during each passage of the light therethrough; and means for deriving from the combination of said returned light and said other quantity a signal representative of the product of this portion and said quantity and for processing said signal to yield another signal representative of said characteristic.

3. In an apparatus including a laser productive of a beam of light and capable of laser action in a plurality of longitudinal modes with light developed in each mode being of a frequency differing from the frequency of the light developed in the next adjacent mode, in terms of frequency, by a predetermined amount, the improvement comprising:

means for shifting the frequency of a portion of the light in said beam by said predetermined amount and returning said frequency-shifted light into the active region of said laser.

4. Apparatus as defined in claim 3 in which said shifting means includes an element which shifts the frequency of light emerging form said laser by one-half said predetermined amount and subsequently shifts said light returning to said laser again by one-half said predetermined amount.

5. Apparatus as defined in claim 3 in which said predetermined amount equals C/2L, where C is the velocity of light and L is the resonant optical cavity length of said laser.

6. Optical heterodyning apparatus for analyzing motion of an element, comprising:
- a source of coherent light;
- photodetecting means;
- means for directing a first portion of said coherent light onto said element, for collecting light returned from said element and for directing said returned light to said photodetecting means;
- means for directing a second portion of said coherent light to said photodetecting means for combination in a condition of wavefront alignment with said returned first portion of said coherent light;
- means coupled to said photodetecting means for developing a signal corresponding to the motion of said element; and
- Bragg cell means located in the path of said coherent light for effecting a relative shift in frequency between said first and second portions of said coherent light 7. Optical heterodyning apparatus for analyzing motion of an element, comprising
- a source of coherent light;
- photodetecting means;
- means for directing a first portion of said coherent light onto said element, for collecting light returned from said element and for directing said returned light to said photodetecting means;
- means for directing a second portion of said coherent light to said photodetecting means for combination in a condition of wavefront alignment with said returned first portion of said coherent light;
- frequency discriminating means coupled to said photodetecting means for developing a signal corresponding to the motion of said element; and
- Bragg cell means located in the path of said coherent light for effecting a relative shift in frequency between said first and second portions of said coherent light, whereby the electrical output from said photodetecting means has an instantaneous frequency which equals the algebraic sum of the frequency applied to said Bragg cell means and the instantaneous velocity of the motion of said element multiplied by a constant.

8. Optical heterodyning apparatus for analyzing motion of an element, comprising:
- a source of coherent light;
- photodetecting means;
- first means for focusing a first portion of said coherent light onto said element and for collecting light returned from said element, and second means for directing said returned light to said photodetecting means;
- mirror means for directing a second portion of said coherent light to said photodetecting means for combination in a condition of wavefront alignment with said returned first portion of said coherent light;
- frequency discriminating means coupled to said photodetecting means for developing a signal corresponding to the motion of said element; and
- Bragg cell means located in the path of said coherent light for effecting a relative shift in frequency between said first and second portions of said coherent light, whereby the electrical output from said photodetecting means has an instantaneous frequency which equals the algebraic sum of the frequency applied to said Bragg cell means and the instantaneous velocity of the motion of said element multiplied by a constant.

9. Optical heterodyning apparatus for analyzing motion of an element, comprising:
- a source of coherent light;
- photodetecting means;
- lens means for focusing a first portion of said coherent light onto said element and for collecting light returned from said element;
- means for directing said returned light to said photodetecting means and for directing a second portion of said coherent light to said photodetecting means for combination in a condition of wavefront alignment with said returned first portion of said coherent light;
- means coupled to said photodetecting means for developing a signal corresponding to the motion of said element; and
- Bragg cell means in the path of said coherent light driven by a signal source and constructed and arranged to receive and act upon light arriving from opposite directions such that said signal developed by said photodetecting means has a frequency equal to twice that developed by said signal source.

10. Optical heterodyning apparatus for analyzing motion of an element, comprising:
- a source of coherent light;
- photodetecting means;
- lens means for focusing a first portion of said coherent light onto said element and for collecting light returned from said element;
- means for directing said returned light to said photodetecting means and for directing a second portion of said coherent light to said photodetecting means for combination in a condition of wavefront alignment with said returned first portion of said coherent light;
- means coupled to said photodetecting means for developing a signal corresponding to the motion of said element; and
- Bragg cell means driven by a signal source and constructed and arranged to receive and act upon light arriving from opposite directions such that said signal developed by said photodetecting means has a frequency equal to twice that developed by said signal source, said Bragg cell being located in said first light portion.

11. A method of analyzing motion of an element, comprising:
- generating a beam of coherent light;
- directing a first portion of said coherent light beam onto said element, collecting light returned from said element and directing said returned light to a detecting location;
- directing a second portion of said light beam to said detecting location for combination in a condition of wavefront alignment with said returned first portion of said light beam;
- acousto-optically effecting a relative shift in frequency between said first and second portions of said coherent light; and
- at said detecting location, photodetecting said combined first and second portions of said light beam.

12. A method of analyzing motion of an element, comprising:
- generating a beam of coherent light;

directing a first portion of said light beam onto said element, collecting light returned from said element and directing said returned light to a detecting location;

directing a second portion of said light beam to said detecting location for combination in a condition of wavefront alignment with said returned first portion of said light beam;

with a Bragg cell located in the path of said light beam, effecting a relative shift in frequency between said first and second portions of said light beam; and at said detecting location, photodetecting said combined first and second portions of said light beam and developing a signal whose instantaneous frequency corresponds to the motion of said element, said instantaneous frequency being equal to the algebraic sum of the frequency applied to the Bragg cell and the instantaneous velocity of the motion of the element multiplied by a constant.

13. A method of analyzing motion of an element, comprising:

generating a beam of coherent light;

focusing a first portion of said light beam onto said element and collecting light returned from said element;

directing said returned first portion light and a second portion of said light beam to said detecting location for combination in a condition of wavefront alignment;

with a Bragg cell driven by a signal source and arranged in the path of said light beam to receive and act upon light arriving from opposite directions, effecting a relative shift in frequency between said first and second portions of said light beam which equals twice the frequency developed by the signal source; and at said detecting location, photodetecting said combined first and second portions of said coherent light beam and developing a signal corresponding to the motion of said element.

14. A method of analyzing motion of an element, comprising:

generating a beam of coherent light;

focusing a first portion of said light beam onto said element and collecting light returned from said element;

directing said returned first portion light and a second portion of said light beam to said detecting location for combination in a condition of wavefront alignment;

with a Bragg cell driven by a signal source and located in the path of said first portion of said light beam to receive and act upon light arriving from opposite directions, effecting a relative shift in frequency between said first and second portions of said light beam which is twice the frequency developed by the signal source; and at said detecting location, photodetecting said combined first and second portions of said light beam and developing a signal corresponding to the motion of said element.

* * * * *